US006423410B1

(12) United States Patent
Sucholeiki et al.

(10) Patent No.: US 6,423,410 B1
(45) Date of Patent: Jul. 23, 2002

(54) ULTRASONICALLY GENERATED PARAMAGNETIC POLYMER PARTICLES

(75) Inventors: Irving Sucholeiki, Watertown; Nak-Ho Sung, Lexington; Jun Young Lee, Medford, all of MA (US)

(73) Assignee: MDS Proteomics, Inc., Toronto (CA)

( * ) Notice: Subject to any disclaimer, the term of this patent is extended or adjusted under 35 U.S.C. 154(b) by 0 days.

(21) Appl. No.: 09/365,506

(22) Filed: Aug. 2, 1999

Related U.S. Application Data (60) Provisional application No. 60/099,215, filed on Sep. 4, 1998.

(51) Int. Cl.[7] .................................................. B32B 5/16
(52) U.S. Cl. ........................ 428/403; 428/407; 524/202
(58) Field of Search ................................ 428/403, 407; 524/202

(56) References Cited

U.S. PATENT DOCUMENTS

| | | | |
|---|---|---|---|
| 4,358,388 A | | 11/1982 | Daniel et al. |
| 4,421,660 A | * | 12/1983 | Sole Nee Hajna ....... 252/62.54 |
| 4,873,102 A | * | 10/1989 | Chang et al. ............... 427/130 |
| 5,091,206 A | * | 2/1992 | Wang et al. .................... 427/2 |
| 5,232,782 A | | 8/1993 | Charmot |
| 5,356,713 A | * | 10/1994 | Charmot et al. ............ 428/407 |
| 5,648,124 A | * | 7/1997 | Sutor .......................... 427/475 |
| 5,684,130 A | | 11/1997 | Sucholeiki |
| 5,750,412 A | | 5/1998 | Sucholeiki |
| 5,814,687 A | * | 9/1998 | Kasai et al. ................. 523/223 |
| 5,834,121 A | * | 11/1998 | Sucholeiki et al. ......... 428/407 |
| 5,858,534 A | * | 1/1999 | Sucholeiki ................... 428/407 |
| 6,133,047 A | * | 10/2000 | Elaissari et al. ............ 436/526 |
| 6,268,222 B1 | * | 7/2001 | Chandler et al. ........... 436/523 |

OTHER PUBLICATIONS

J. P. Lorimer Et Al, Effect of Ultrasound on the Encapsulation of Titanium Dioxide Pigment, Colloid & Polymer Science 269, pp. 392–392, 1991.

Kenneth S .Suslick Et Al, Sonochemical Synthesis of Iron Colloid, Journal of American Chemical Society, vol. 118, No. 47, 1996, 11961.

* cited by examiner

Primary Examiner—Hoa T. Le
(74) Attorney, Agent, or Firm—Greenblum & Bernstein, P.L.C.

(57) ABSTRACT

A composite paramagnetic particle and method of making are provided. In one aspect of the invention, a particle comprising a multitude of submicron polymer bead aggregates covalently cross-linked to each other to form larger diameter particles is presented. Distributed throughout the composite paramagnetic particle are vacuous cavities. Each submicron polymer bead has distributed throughout its interior and surface submicron magnetite crystals. In another aspect of the invention, composite particles are made using high energy ultrasound during polymerization of one or more vinyl monomers. In one embodiment, high energy ultrasound is used during an emulsification step and during the early stages of the polymerization process to produce micron sized composite paramagnetic particles. The particles according to the invention exhibit a high percent magnetite incorporation and water and organic solvent stability.

22 Claims, 5 Drawing Sheets

ULTRASONICALLY GENERATED PARAMAGNETIC POLYMER PARTICLES

This application claims priority under 35 U.S.C. §119(e) of provisional application No. 60/099,215, filed Sep. 4, 1998.

FIELD OF THE INVENTION

The present invention relates to a paramagnetic polymer particle and method of making.

More specifically, the present invention relates to an ultrasonically generated composite paramagnetic polymer particle including a plurality of paramagnetic polymer bead aggregates.

BACKGROUND OF THE INVENTION

A typical method for measuring the binding of antigens or ligands to proteins is particle agglutination or precipitation. In such a method a protein bound suspension of beads or particles reacts with some antigen or ligand causing the particles to flocculate or precipitate. Quantitation is accomplished through the use of spectrophotometry to measure the change of light transmission through the medium. Another method which is far more sensitive is the use of radioactivity in the measurement. In such a method, either the ligand or the particle bound protein is radiolabeled and complexed with either unlabeled protein or ligand. The uncomplexed material is then separated from the bound complex by simple filtration and then counted through the process of scintillation. Filtration of insoluble particles incorporating a protein-ligand complex is efficient when large numbers of particles are employed, yet can be difficult when small numbers of particles are used.

In cases where small numbers of particles are used, other insoluble supports are utilized, such as paramagnetic particles. U.S. Pat. No. 5,750,412 discloses exposing antibody-bound paramagnetic particles to a magnetic field in order to separate antibody-bound antigen from unbound antigen in immunoassays. Such materials are attracted to a magnetic field and this attraction is used to separate the bound protein-ligand complex from the surrounding liquid medium. Magnetic separation methods have also been applied successfully in cell sorting. A definite advantage that magnetic separation has over simple filtration is the ability to separate out small numbers of particles from small reaction volumes. Another advantage magnetic separation has over simple filtration is the ease to which one is able to automate the simultaneous washing and separation of hundreds of individual solid phase complexation reactions.

In the pharmaceutical industry, compound libraries for biological testing are routinely synthesized through the use of solid phase organic chemistry. Solid phase organic synthesis allows for the quick separation of products from unreacted starting material as well as reagents and side-products that are not originally bound to the support. The physical separation of the support from the solubilized components of the reaction mixture has primarily been accomplished by filtration through a glass or polymer filter. Although filtration has been the method of choice in solid phase organic synthesis, it has limitations that warrant the development of newer approaches. One such limitation is the difficulty in automating the simultaneous washing and filtration of hundreds of small scale solid-phase reactions.

U.S. Pat. No. 5,684,130 discloses the use of magnetic separation in the field of solid-supported organic chemistry has recently been demonstrated in the synthesis of peptides, non-peptides compounds and in the affinity chromatography of compound mixtures using a paramagnetic support in organic solvent. Clearly, paramagnetic supports have many useful applications, including in biology and chemistry which warrant the development of improved paramagnetic supports and/or better methods for their manufacture.

U.S. Pat. No. 4,358,388 discloses magnetite crystals encapsulated in polystyrene by the suspension polymerization of styrene in the presence of an organosoluble initiator, a suspending agent, magnetite ($Fe_3O_4$) and an emulsifying agent in water. The mixture was homogenized to give organic phase droplets ranging from 0.03–5 microns in diameter. The homogenized mixture was then polymerized to give spherically shaped magnetic-polymer latex particles. The resulting particles consist of a core of polystyrene polymer with magnetite crystals located as inclusions along the outer most periphery of the particles.

U.S. Pat. No. 5,091,206 also discloses a process for producing paramagnetic particles with a uniform spherical surface. Magnetite crystals are coated on the surface of pre-made uniformly spherical polystyrene particles (2–6 microns in diameter) to form a non-covalent composite or "seed". A vinyl monomer is then polymerized on the surface of the polymer particles-magnetite seeds to produce spherical paramagnetic particles having an average particle diameter of between 4–7 micrometers. The polymerization process involved heating together in a rotating reaction flask small quantities of polymer particles-magnetite seeds, vinyl monomer, water soluble initiator and an anionic surfactant in water. The percent magnetite incorporation of the particles is increased by taking the polymer coated magnetite particles and successively adding more magnetite to them to form new "seeds" which are again polymerized together. This process of successively adding magnetite followed by polymer coating the resulting aggregate layers can enhance the percent magnetite incorporation of the final paramagnetic bead. However, among other disadvantages, in order to achieve relatively high levels of magnetite incorporation repeated polymerization and separation steps are required making this method both very costly and time consuming to perform.

Many variables contribute toward the ultimate size, shape and thickness of polymer coatings. The amount and types of surfactant used, the reaction temperature and the stirring speed and/or the agitation method can all have a direct effect on structural properties. For example, power ultrasound has been reported to enhance the uniformity of polymer coverage around titanium dioxide particles under emulsion polymerization conditions and to aid in the formation of nanometer sized iron colloid particles. See J. P. Lorimer et al, 269 Colloid. Polym. Sci. 393–397 (1991); K. S. Suslick et al, 118 J. Am. Chem. Soc. 11960–61 (1996).

There are many drawbacks to prior art paramagnetic polymer particles and methods of making. Current polymer coated paramagnetic particles are relatively expensive to produce. For example, making polymer coated magnetite particles exhibit high levels of magnetite incorporation is both costly and time consuming. Because magnetite is hydrophilic by nature, it is difficult to stabilize in the hydrophobic environment of a monomer droplet. A number of different and sometimes exotic surfactants, co-surfactants and suspending agents are usually required in order to allow the magnetite to be closely associated with the monomer droplets. U.S. Pat. No. 5,232,782 discloses metal oxides made more hydrophobic by coating them with an organosilating reagent. However making the magnetite more hydrophobic can produce other problems that can be difficult to predict let alone control. For example, due to an increase in the number of hydrophobic components in the polymer reaction mixture, more surfactant is required to stabilize the magnetite incorporated monomer droplet. However, too much surfactant can force the separation of the hydrophobic magnetite and the monomer droplet itself, resulting in a lowering in the magnetite incorporation. Too little surfactant can result in rapid aggregation of the magnetite itself causing the hydrophobic magnetite to fall out of suspension. It can also cause the coalescence of the monomer droplets into larger droplets containing less magnetite. Another problem is the expense and time required to make very small and uniform magnetite crystals having a diameter of less than 1 micron in size. Lastly, it is difficult to make polymer coated paramagnetic particles be stable both in an aqueous as well as an organic solvent environment.

SUMMARY OF THE INVENTION

It is a primary object of the present invention to provide an improved paramagnetic polymer particle.

It is another primary object of the invention to provide a composite paramagnetic particle having high levels of magnetite incorporation.

It is another object of the present invention to provide a paramagnetic polymer particle that is stable to both water and organic solvents.

It is another object of the present invention to provide a composite paramagnetic polymer particle including a plurality of interconnected beads interspersed by cavities.

It is another object of the present invention to provide a composite paramagnetic polymer particle including a plurality of interconnected bead aggregates interspersed by cavities.

It is a further object of the present invention to provide a method of making the composite paramagnetic particles of the invention.

It is a further object of the present invention to provide an easy and inexpensive method of making the composite paramagnetic particles of the invention.

It is a further object of the present invention to provide a method of making a composite paramagnetic particle using ultrasound.

It is a further object of the present invention to provide a method of making a composite paramagnetic particle using magnetite coated with a hydrophobic compound or a silylating agent.

It is a further object of the present invention to provide a method of making magnetite crystals of submicron size suitable for use in making the composite particle of the present invention.

These and other objects of the present invention are achieved by a composite paramagnetic particle comprising a plurality of interconnected primary beads interspersed by vacuous cavities and method of making. In a preferred embodiment, the particle of the invention comprises a plurality of interconnected bead aggregates, each aggregate comprising interconnected primary beads. The particles can be made according to the method of the present invention in such quantities as desired.

The bead aggregates are each comprised of submicron primary beads, each primary bead comprising a cross-linked polymer preferably incorporating on the surface and/or inside, inclusions of paramagnetic magnetite crystals. These crystals can also be incorporated within cavities located between proximally attached submicron primary beads.

Each submicron primary bead preferably has incorporated at least one metal oxide crystal on the surface or within the cross-linked polymer. However, it is not necessary that every primary bead or bead aggregate contain magnetite as long as the composite paramagnetic particle as a whole contains magnetite. Throughout the composite paramagnetic particle are distributed various sized vacuous cavities.

In making the composite paramagnetic polymer particle of the present invention, high energy ultrasound is applied during a homogenization step and/or the polymerization steps of a reaction mixture including one or more vinyl monomers, a cross-linking agent, submicron magnetite crystals that are either coated with an organosilating agent or uncoated and one or more surfactants in water. The preferred method involves applying high energy ultrasound during both the homogenization and early stages of the polymerization reaction. The vinyl monomers may have reactive side groups. Preferably, the monomers used to form the composite, paramagnetic polymer particle are styrene or styrene type derivatives.

The composite paramagnetic particles of the present invention may be made by a number of different polymerization methods. A preferred method includes four steps with the first being a homogenization step including the application of high energy ultrasonic energy such as through the use of an ultrasonic probe to an aqueous mixture including one or more vinyl monomers, cross-linking agent, organosilane coated or noncoated magnetite crystals of preferably less than 0.05 microns in diameter, a water soluble or organic soluble initiator and one or more emulsifying agents. When the magnetite crystals are not coated with an organosilane, mineral oil is used as a suspending agent. The second step involves applying high energy bath ultrasound produced by an immersible ultrasonic transducer to the homogenized reaction mixture at an elevated temperature while maintaining constant stirring and under an inert atmosphere for the early stages of the polymerization reaction. The third step involves the continued heating and stirring of the reaction mixture without the presence of high energy bath ultrasound for the duration of the polymerization reaction. The fourth step involves separating out the magnetite encapsulated polymer from the reaction mixture.

DESCRIPTION OF THE PREFERRED EMBODIMENTS

In one aspect of the present invention, a composite paramagnetic particle comprises a plurality of submicron primary beads, preferably arranged as covalent bead aggregates, the aggregates covalently attached to each other and composed of cross-linked polymer which may be functionalized. Embedded in many of the polymer beads are magnetite crystals. Throughout the composite particle are located vacuous cavities that are devoid of both submicron primary beads and magnetite crystals. The particle is stable in both water and organic solvents including acetone, methanol, ethanol and hexane. With higher levels of cross-linking the composite paramagnetic particles become more stable to polar organic solvents such as methylene chloride and tetrahydrofuran at elevated temperatures and under high energy sonication.

Figure 1:
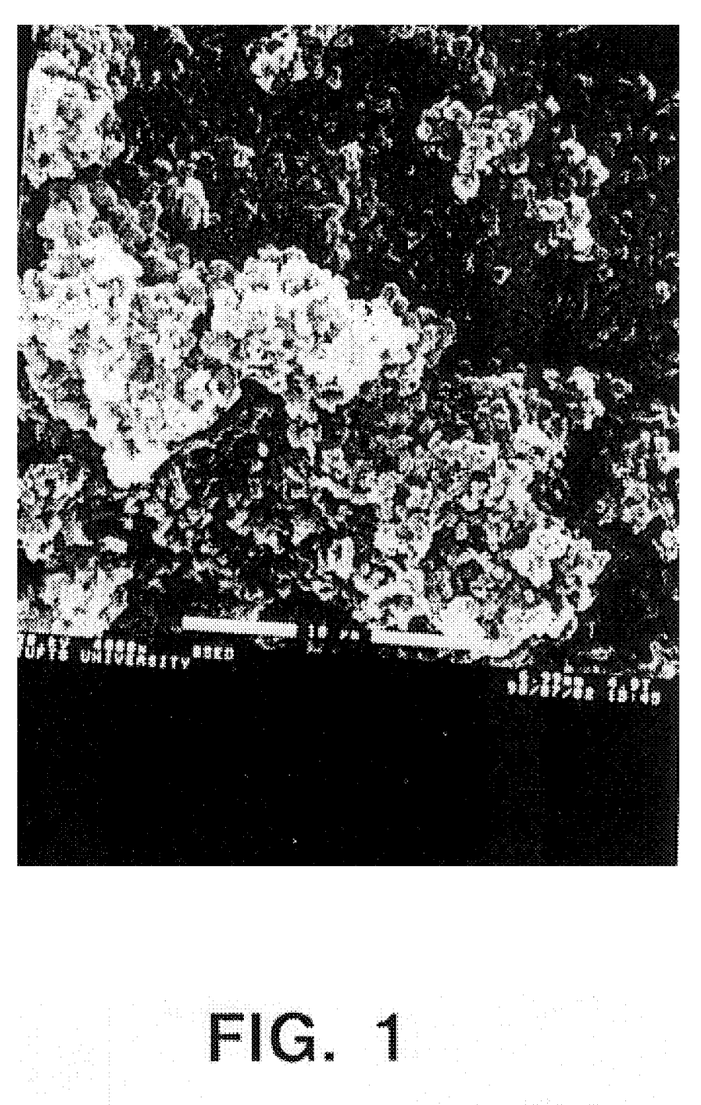
FIG. 1 is an environmental scanning electron micrograph of the surface of a composite paramagnetic particle according to the present invention at a magnification of 4000×.
Figure 2:
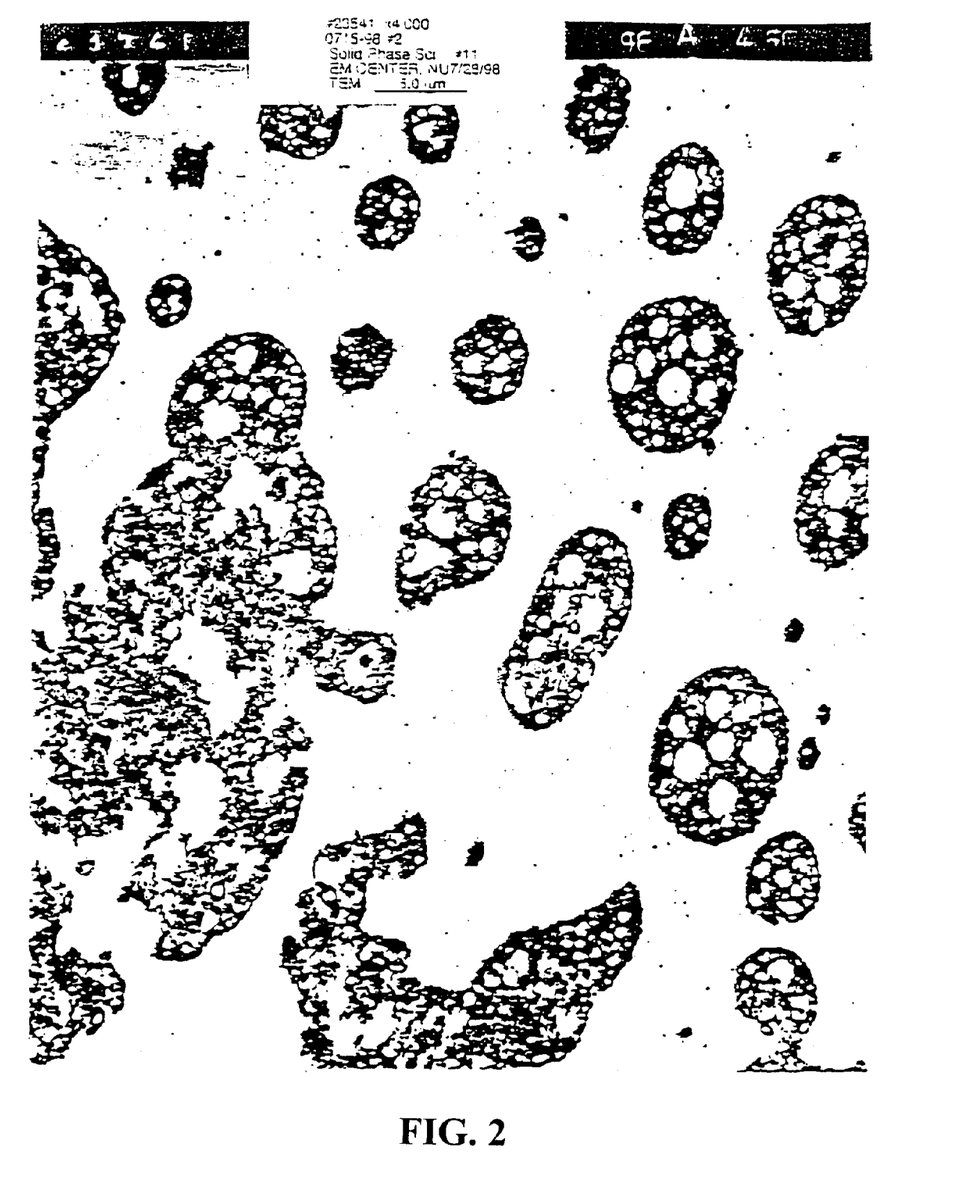
FIG. 2 is a transmission electron micrograph of a cross-section of several composite paramagnetic particles according to the present invention at a magnification of 4000×.
Figure 3:
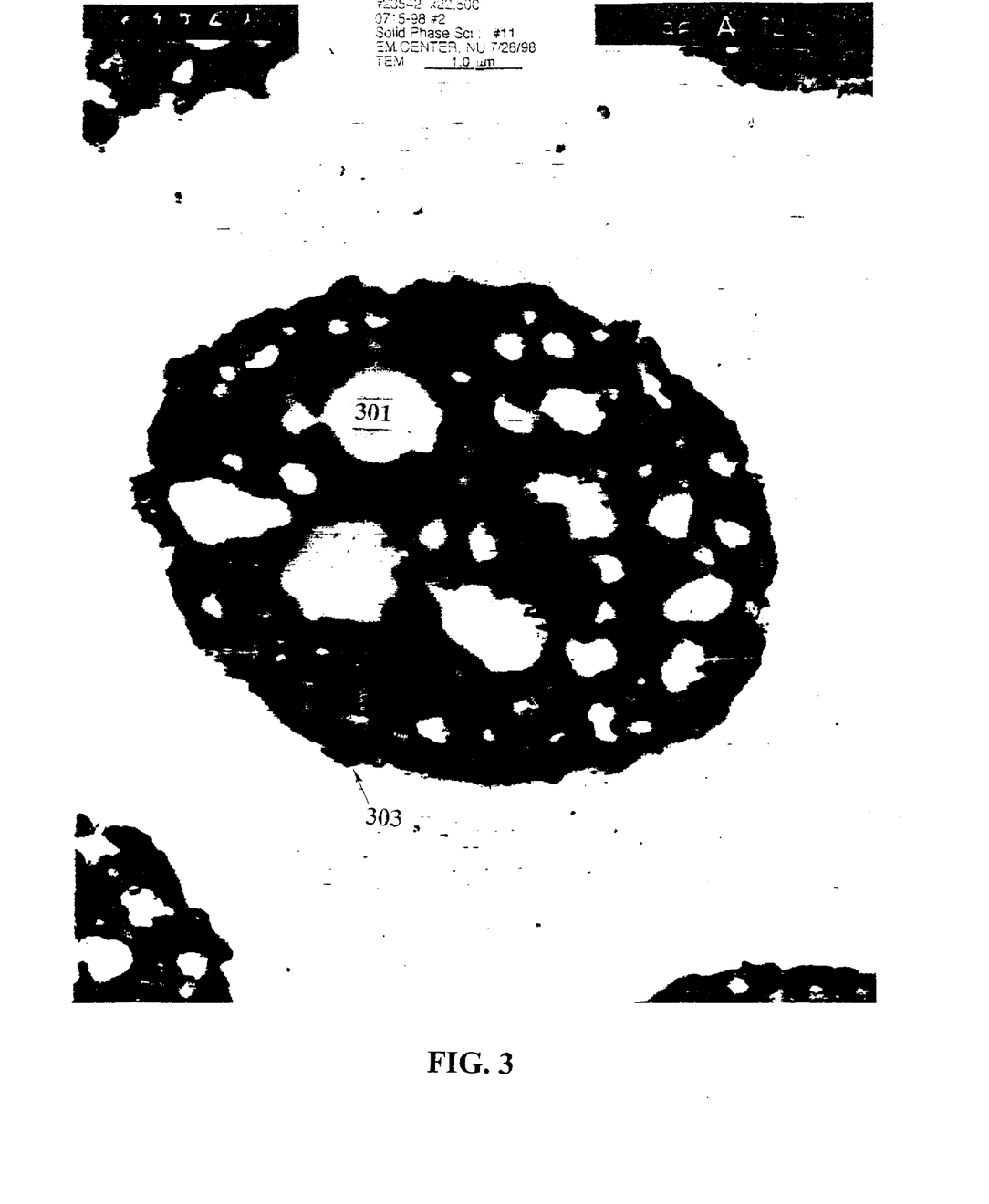
FIG. 3 is transmission electron micrograph of a cross-section of a composite paramagnetic particle according to the present invention at a magnification of 22,500×.

The surface of a composite paramagnetic particle according to the present invention is shown in the environmental scanning electron micrograph of FIG. 1. The surface of the particle has a multitude of submicron, spherically shaped beads that are covalently bonded together. A cross-section of several different sized composite paramagnetic particles of the invention are shown in the scanning electron micrograph of FIG. 2. An enlarged cross-sectional view of one of these composite paramagnetic particles is shown in FIG. 3. Vacuous cavities 301 of various sizes are distributed throughout the composite paramagnetic particle as shown in FIG. 3. The individual submicron beads 303 that make up the composite paramagnetic particle can be seen as rounded dark images. The black dots interspersed throughout the composite paramagnetic particle are believed to be magnetite crystals either as individual crystals or in the form of crystal aggregates. While not limiting to the invention, the particle shown in FIG. 3 has a diameter of approximately 6 microns, whereas the submicron beads 303 are approximately 0.1 to 0.13 microns in diameter.

The magnetite crystals can be made by several methods using a combination of iron(II) and iron(III) metal salts. A preferred method involves the addition by dropping funnel of an excess of sodium hydroxide solution to a heated, sonicated and stirred reaction mixture made up of equal molar quantities of iron(II)sulfate and iron(III)sulfate dissolved in deionized water. The magnetite crystals that are formed are then magnetically separated and washed repeatedly until neutral to pH. The magnetite crystals formed are preferably under 1 micron in size. It is observed that in the absence of the application of ultrasonic energy to the reaction mixture one obtains a larger percentage of magnetite crystals that are larger than 1–2 microns in diameter. After washing and magnetically separating the magnetite crystals they are dried. The dried crystals are then crushed using a mortar and pestle to give crystals with a diameter preferably equal to or less than 0.06 microns as observed using transmission electron microscopy.

The quantity of magnetite crystals used during the polymerization process may range from 1–60% by weight based upon the weight of the total monomer(s) added during the homogenization step. The magnetite crystals may be precoated with a hydrophobic coating before use in the homogenization step such as with silica oil or mineral oil or some hydrophobic silylating agent such as phenyltriethoxysilane or a polymerizable vinyl containing triethoxyvinylsilane such as methacryloxypropyltrimethoxysilane available commercially from Dow Corning. It is preferred that the magnetite crystals be precoated with some hydrophobic coating before use in the homogenization step. It is preferred that the amount of magnetite crystals used be between 10–50% by weight of total monomer added during the homogenization step.

The monomers which are suitable for making the composite paramagnetic particle of the invention are vinyl monomers such as styrene and substituted styrenes, acrylates and methacrylates. Inclusion of a desired percentage of functionalized monomers eliminates the step of providing functionalized groups after the polymerization process. The cross-linking agents may be composed of any divinyl monomer such as divinyl benzene. An amount of divinyl monomer is added so that the final polymer is cross-linked in the range of 1 to 50%. It is preferred that the level of cross-linking in the composite paramagnetic particle be in the range of between 4–20%.

A polymerization initiator is preferably added at about 1–10% by weight based upon the weight of the total monomer(s) added during the homogenization step. The initiator may be either organic solvent soluble or water soluble. When an organically soluble initiator is used the preferred initiators are alkyl and aryl peroxides. Preferably, lauroyl peroxide is used. When a water soluble initiator is used the preferred initiator is potassium persulfate. However, other means of initiation may be used such as ultrasonically induced radical formation. It has been observed that when a water soluble initiator is used a greater percentage of magnetite is found incorporated in the composite paramagnetic particle as compared to when an organic soluble initiator is used.

One or more dispersing agents are added preferably at about 1–15% each by weight based upon the weight of the total monomer(s) added during the homogenization step. The dispersing agents may be anionic, cationic or neutral in nature. In a preferred embodiment both a charged and a neutral emulsifying agent are used at concentrations of 1–15% each by weight of the total monomer(s) present during the homogenization step. The preferred charged emulsifying agent is the anionic surfactant sodium lauryl sulfate. Examples of non-ionic dispersants are polyvinyl alcohol, cellulose based compounds and alkylphenols. The preferred non-ionic dispersants are both branched and unbranched phosphated, ethoxylated nonylphenol.

Figure 4:
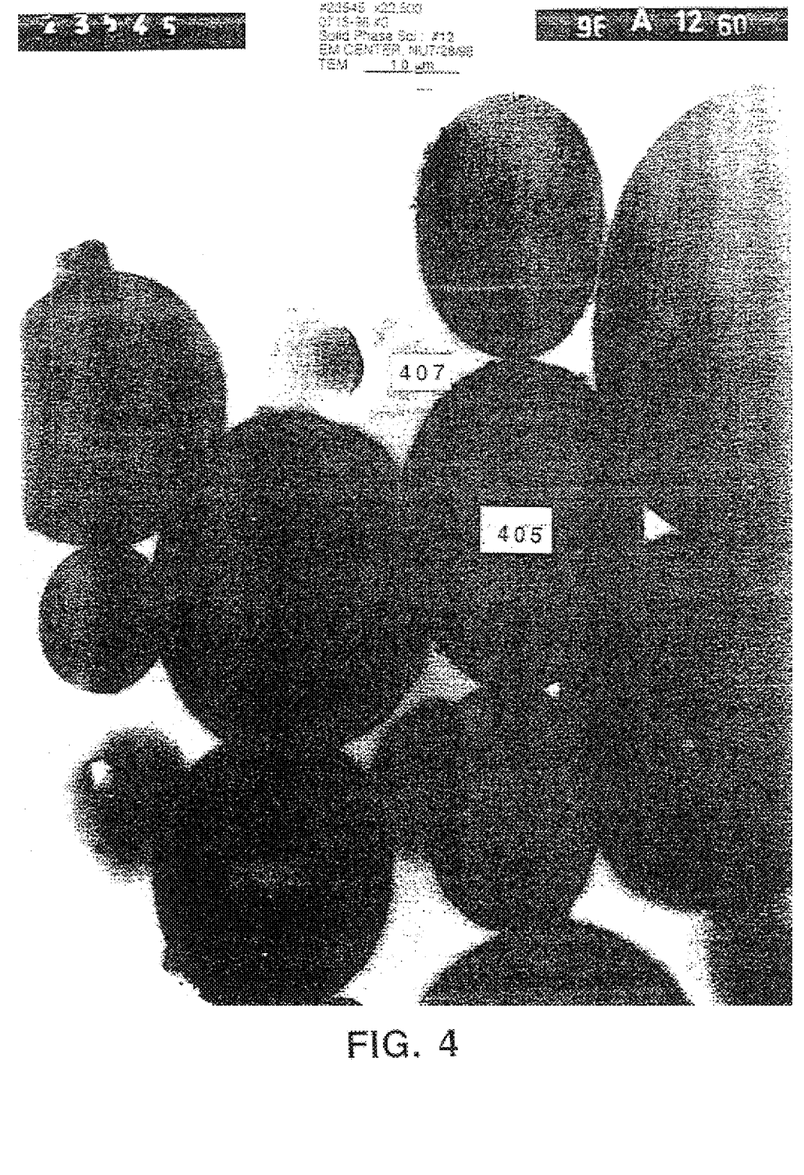
FIG. 4 is transmission electron micrograph of prior art paramagnetic particles made without the introduction of ultrasound either during the homogenization or during the polymerization process at a magnification of 22,500×.

In another aspect of the present invention, the application of ultrasound is important to the successful production of composite paramagnetic particle of the invention. If ultrasound is not used in the process one obtains particles that are substantially different from those made with the use of high energy ultrasound. A cross-section of several paramagnetic particles made without the aid of ultrasound are shown in the scanning electron micrograph, FIG. 4. The paramagnetic particles 405 incorporate magnetite crystals 407 primarily as inclusions on the surface of each individual spherical particle 405. By way of comparison, spherical particles 405 contain neither magnetite crystals nor vacuous cavities within the core of the particle 405 themselves nor are they composed of a multitude of smaller submicron polymer particles.

According to the present invention, ultrasound can be applied during either the homogenization stage and/or the polymerization stage of the method of the invention. The preferred application of ultrasound is during both the homogenization stage and during the early stages of the polymerization process. Various methods for applying ultrasonic energy are possible. Examples of sonicating systems are high energy probe sonicators, immersible sonicators and sonicating cup horns. It is preferred that a high energy probe sonicator be used during the homogenization step and a high energy, immersible sonicator be used during the early stages of the polymerization process.

In a preferred embodiment of the invention, noncoated magnetite crystals are mixed with mineral oil and added to a solution composed of styrene monomer, divinyl benzene monomer and an organic soluble polymerization initiator to form a dispersed phase. In another embodiment of the invention, when organosilane coated magnetite is used no mineral oil is required. Instead, the organosilane coated magnetite is mixed directly with the styrene monomer, divinyl benzene monomer and the organic soluble polymerization initiator to form the dispersed phase. A continuous fluid phase is formed from degassed, deionized water and dispersant agents. When the initiator is water soluble, it is dissolved in the continuous fluid phase rather than the dispersed phase.

The dispersed phase is added to the continuous fluid phase in a ratio of about 1:15 to about 1:3 dispersed to continuous phase (vol:vol) and preferably at a ratio of about 1:7 to about 1:5. The continuous fluid phase-dispersed phase is homogenized using a high energy sonicating probe for about 1–5 minutes and at a power level of about 40–100%. Preferably the fluid phase-dispersed phase is sonicated for about 1–2 minutes at a power of about 50–80%. The homogenized mixture is then simultaneously sonicated, heated and stirred for about 5–120 minutes. It is preferred that the homogenized mixture be bath sonicated for no more than 30 minutes while heated and stirred under closed nitrogen atmosphere. Heating and stirring of the mixture is continued under a closed atmosphere for the duration of the polymerization reaction. It is preferred that the heating and stirring continue for a total of about 18–24 hours beyond the bath sonicating phase. The crude polymer product is then washed and either filtered or magnetically separated to give the desired composite, paramagnetic particles. The final particle size preferably ranges from about 0.75 to 300 microns. Particles equal to or under 5 microns are preferred.

Although the overall composition of the paramagnetic particles maintains constant, it has been observed that factors such as the stirring speed as well as the shape of the stir blade itself can have a profound effect on the size distribution of the final composite paramagnetic particle product. With faster stirring speed one obtains composite paramagnetic particles having a smaller average particle size. It is preferred that a rate raging between about 350–900 rpm be maintained throughout the polymerization reaction. In order to obtain the largest amount of composite paramagnetic particles having an average particle size of 5 micron or below, it is preferred to have a stirring speed during the polymerization reaction of about 700–900 rpm.

For purposes of example only, the invention finds use as a separation support system which can be resuspended in solution, then magnetically separated by applying a magnetic field, and subsequently resuspended. Such a separation system is useful, for example, in immunodiagnostics, affinity chromatography and receptor-ligand binding assays as well as in the solid phase synthesis of organic molecules. In addition, the present invention may also find uses as a building block for the synthesis of other paramagnetic materials.

The following Examples are provided to illustrate presently preferred embodiments of the invention and not to limit its scope, which is defined by the appended claims.

Synthesis and Isolation of Magnetite Crystals

EXAMPLE 1

To a 500 ml round bottom flask is added a solution of 30.09 grams (0.108 moles) of iron(II)sulfate heptahydrate dissolved in 120 ml of deionized water and a solution of 54.12 grams (0.110 moles) of iron(III)sulfate pentahydrate dissolved in 120 ml of deionized water. The stirred solutions was then heated at 85° C. and sonicated using a Heat Systems Inc. 20 KHz sonicating probe, model XL2020 (Farmingdale, N.Y.) at 25% power following the program of 1 minute "on" and 1 minute "off". To the stirred, heated and sonicated reaction mixture was slowly added by dropping funnel a solution of 60 grams of NaOH in 250 ml of deionized water over a period of 1 hour. After the addition of the sodium hydroxide solution the heated and stirred reaction was sonicated for an additional 40 minutes and then the reaction was allowed to cool to room temperature to give magnetite crystals as a fine black suspension. The reaction mixture was transferred to a 1 liter beaker. A series of neodymium permanent magnets embedded in a flat plastic sheet was then placed underneath the beaker. The magnetite suspension was allowed to sit at room temperature until all of the magnetite crystals magnetically separated to the bottom of the beaker. The water was then aspirated off and the resulting magnetite crystals washed with deionized water. The magnetite crystals were magnetically separated again and then washed. The water washes and magnetic separations continued until the washes were neutral to pH. The magnetite crystals were then dried under reduced pressure to give 24.9 grams of magnetite crystals as a black solid. The solid was then lightly crushed with a mortar and pestle to give magnetite crystals ($Fe_3O_4$) as a fine powder that by transmission electron microscopy consisted of individual crystals of magnetite of equal to or under 0.06 microns in size.

Synthesis and Isolation of Ultrasonically Generated Composite Paramagnetic Particles

EXAMPLE 2

To a 500 ml three neck flask is added a solution consisting of 1 gram of sodium dodecyl sulfate and 1 gram of ethoxylated, phosphated, nonylphenol (Servoxyl VPNZ 20/100 obtained from SERVO DELDEN BV, The Netherlands) dissolved in 200 ml of deionized and degassed water to form the continuous phase. To a beaker containing three grams of magnetite crystals ($Fe_3O_4$) is added 2.5 grams of mineral oil and manually mixed. To the mixture is then added 30 grams of styrene, 1.5 grams of divinyl benzene and 3 grams of lauroyl peroxide to form the dispersed phase. The dispersed phase is then transferred to the 500 ml three neck round bottom flask and the combined continuous-dispersed phases are sonicated using a Heat Systems Inc. 20 KHz, 550 watts sonicating probe, model XL2020 (Farmingdale, N.Y.) at 50% power for 1 minute. The round bottom flask is then transferred to a temperature controlled sonicating tank and the homogenized mixture is then simultaneously heated at 50° C., stirred using an overhead stirrer at 350 rpm and sonicated using a 40 KHz, 600 watts, immersible sonicator (CAE Blackstone, Jamestown, N.Y.) at 55% power for 30 minutes under a nitrogen atmosphere. After 30 minutes the sonication was stopped and the reaction mixture was stirred and heated under a closed nitrogen atmosphere for an additional 18 hours at 50° C. The reaction mixture was then filtered through a 0.5 mm metal mesh screen into a 1 liter beaker. To the beaker is added 400 ml of methylene chloride and 400 ml of methanol and manually stirred. To the bottom of the beaker was placed a plate incorporating a series of embedded neodymium permanent magnets (Master Magnetics, Castle Rock, Colo.). The top milky white, aqueous layer was then aspirated off. To the remaining organic layer was added another 400 ml of methanol to give a light brown suspension. The brown suspension was then filtered, washed with methanol and dried under reduced pressure to give 18.4 grams of composite, paramagnetic particles. Elemental analysis of the product gave 84.25% carbon, 7.25% hydrogen and 4.37% iron. Electron microscopy of a sampling of the composite, paramagnetic, particles can be seen in FIGS. 1–3.

EXAMPLE 3

This example demonstrates the incorporation of high levels of cross-linking and functionalization into a composite paramagnetic support. To a 500 ml three neck flask is added a solution consisting of 1 gram of sodium dodecyl sulfate, 1 gram of ethoxylated, phosphated, nonylphenol (Servoxyl VPNZ 20/100 obtained from SERVO DELDEN BV, The Netherlands) dissolved in 200 ml of deionized and degassed water to form the same continuous phase as experiment 2. To a beaker containing three grams of magnetite crystals ($Fe_3O_4$) is added 2.5 grams of mineral oil and manually mixed. To the mixture is then added 24.1 grams of styrene, 3.1 grams of divinyl benzene, 4.2 grams of chloromethyl styrene and 3 grams of lauroyl peroxide to form the dispersed phase. The dispersed phase is then transferred to the 500 ml three neck round bottom flask and the combined continuous-dispersed phases are sonicated using a Heat Systems Inc. 20 KHz, 550 watts sonicating probe, model XL2020 (Farmingdale, N.Y.) at 50% power for 1 minute. The round bottom flask is then transferred to a temperature controlled sonicating tank and the homogenized mixture is then simultaneously heated at 50° C., stirred using an overhead stirrer at 350 rpm and sonicated using a 40 KHz, 600 watts, immersible sonicator (CAE Blackstone, Jamestown, N.Y.) at 55% power for 30 minutes under a nitrogen atmosphere. After 30 minutes the sonication was stopped and the reaction mixture was stirred and heated under a closed nitrogen atmosphere for an additional 18 hours at 50° C. The reaction mixture was then filtered through a 0.5 mm metal mesh screen into a 1 liter beaker. To the beaker is added 400 mL of methylene chloride and 400 ml of methanol and manually stirred. To the bottom of the beaker was placed a plate incorporating a series of embedded neodymium permanent magnets (Master Magnetics, Castle Rock, Colo.). The top milky white, aqueous layer was then aspirated off. To the remaining organic layer was added another 400 ml of methanol to give a light brown suspension. The brown suspension was then filtered, washed with methanol and dried under reduced pressure to give 3.0 grams of composite paramagnetic particles. Elemental analysis of the product gave 6.34% iron and 2.55% chlorine (which corresponds to 0.71 mmoles chloromethyl/gram of composite paramagnetic support).

Synthesis of Polymeric Paramagnetic Particles Without Use of Ultrasound

EXAMPLE 4

This example is provided to demonstrate the differences obtained in the overall composition of a polymeric paramagnetic particle product when ultrasound is not used in making the particle. The procedure used in this example is exactly the same as that of Example 2 except that a conventional mechanical homogenizer is used during the homogenization step and no ultrasound is used during the polymerization step. To a 500 ml three neck flask is added a solution consisting of 1 gram of sodium dodecyl sulfate, 1 gram of ethoxylated, phosphated, nonylphenol (Servoxyl VPNZ 20/100 obtained from SERVO DELDEN BV, The Netherlands) dissolved in 200 ml of deionized and degassed water to form the same continuous phase as experiment 1. To a beaker containing three grams of magnetite crystals ($Fe_3O_4$) is added 2.5 grams of mineral oil and manually mixed. To the mixture is then added the same quantities of styrene, divinyl benzene and lauroyl peroxide as Example 2 to form the dispersed phase. The dispersed phase is then transferred to the 500 ml three neck round bottom flask and the combined continuous-dispersed phases are homogenized for 2 minutes using a Virtis brand homogenizer (The Virtis Company, Gardiner, N.Y.) incorporating a 20 mm diameter homogenizer shaft. The round bottom flask is then heated at 50° C. while stirring using an overhead stirrer at 350 rpm under a closed nitrogen atmosphere for a total of 18½ hours. The reaction mixture was then worked up in the same manner as that of Experiment 2 to give 13.0 grams of polymer, paramagnetic beads. Elemental analysis of the product gave 90.43% carbon, 7.78% hydrogen and 0.80% iron. Electron microscopy of a sampling of the polymeric, paramagnetic particles can be seen in FIG. 4.

Ultrasonically Induced Composite Paramagnetic Particles With High Levels of Magnetite Incorporation

EXAMPLE 5

Figure 5:
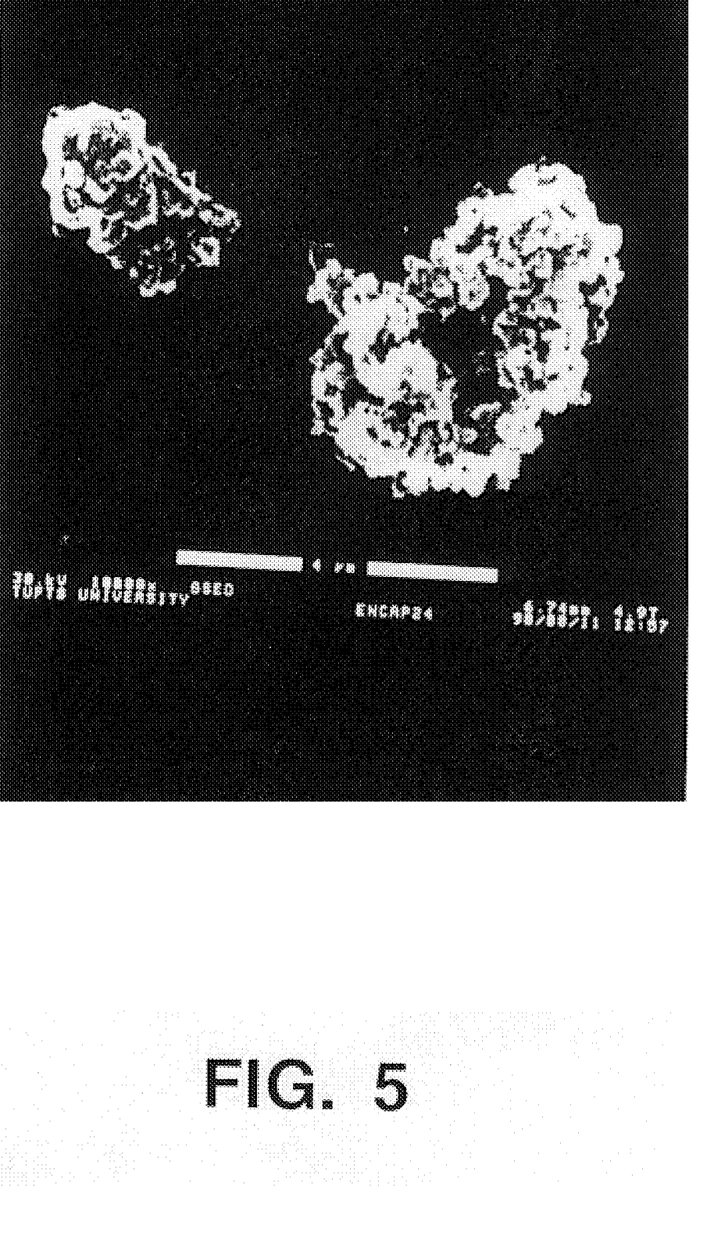
FIG. 5 is an environmental scanning electron micrograph of the surface of two composite paramagnetic particles according to the present invention at a magnification of 10,000×.

This example is provided to demonstrate that one can optimize upward the percent incorporation of magnetite crystals in the composite paramagnetic particles of the invention by moderately modifying some of the reaction conditions. In this case, a water soluble initiator is used in place of an organic soluble initiator and the quantities of magnetite and dispersants used in the beginning of the process are increased. To a 500 ml three neck flask is added a solution consisting of 2 gram of sodium dodecyl sulfate, 2 gram of ethoxylated, phosphated, nonylphenol (Servoxyl VPNZ 20/100 obtained from SERVO DELDEN BV, The Netherlands) and 2 grams of potassium persulfate dissolved in 200 ml of deionized and degassed water to form the continuous phase. To a beaker containing six grams of magnetite crystals ($Fe_3O_4$) is added 4 grams of mineral oil and manually mixed. To the mixture is then added 28.3 grams of styrene and 3.1 grams of divinyl benzene to form the dispersed phase. The dispersed phase is then transferred to the 500 ml three neck round bottom flask and the combined continuous-dispersed phases are sonicated using a Heat Systems Inc. 20 KHz, 550 watts sonicating probe, model XL2020 (Farmingdale, N.Y.) at 70% power for 1 minute. The round bottom flask is then transferred to a temperature controlled sonicating tank and the homogenized mixture is then simultaneously heated at 58° C., stirred using an overhead stirrer at 430 rpm and sonicated using a 40 KHz, 600 watts, immersible sonicator (CAE Blackstone, Jamestown, N.Y.) at 55% power for 30 minutes under a nitrogen atmosphere. After 30 minutes the sonication was stopped and the reaction mixture was stirred and heated under a closed nitrogen atmosphere for an additional 19 hours at 58–60° C. To the reaction mixture which was allowed to cool to room temperature was added 200 mL of deionized water. The reaction mixture was then filtered through a 0.5 mm metal mesh screen into a 1 liter flask. To the flask is added 400 ml of methylene chloride and manually stirred. To the bottom of the flask was placed a plate incorporating a series of embedded neodymium permanent magnets (Master Magnetics, Castle Rock, Colo.). The top milky white, aqueous layer was then aspirated off. To the remaining organic layer was added another 100 ml of methylene chloride and organic was aspirated off leaving behind the magnetically separated solid. The dark brown solid was washed with another 200 ml of methylene chloride, magnetically separated and the organic solvent aspirated off and the resulting brown solid placed under vacuum to give 4.0 grams of a dark brown powder. Elemental analysis of the product gave 21.59% iron. Electron microscopy of a sampling of the composite paramagnetic particles can be seen in FIG. 5.

EXAMPLE 6

This example is provided to demonstrate that one can optimize upward the percent incorporation of magnetite crystals in the composite paramagnetic particles of the invention by utilizing organosilane coated magnetite. 20 grams of magnetite synthesized following the procedure in Example 1 is added to a 250 ml beaker. To the beaker is then added 30 gram of a 10% aqueous solution of methacryloxypropyltrimethoxysilane obtained from Dow Corning. To the mixture is then added 50 ml of deionized water and 10 ml of methanol and mixture stirred at 65–75° C. for 30 minutes then the solvent removed under reduced pressure at 60–70° C. and then placed under pump vacuum for 24 hours to give a black solid which was then manually crushed to a fine black powder that by transmission electron microscopy consisted of individual crystals of magnetite of equal to or under 0.06 microns in size. Three grams of the fine black powder is then added to a 10 ml beaker and added 3 grams of styrene, 0.18 grams of divinyl benzene and 0.06 grams of lauroyl peroxide to form the dispersed phase. To a 500 ml three neck flask is added a solution consisting of 0.2 gram of sodium dodecyl sulfate, 0.2 gram of ethoxylated, phosphated, nonylphenol (Servoxyl VPNZ 20/100 obtained from SERVO DELDEN BV, The Netherlands) dissolved in 250 ml of deionized and degassed water to form the same continuous phase as in Example 2. The dispersed phase is then transferred to the 500 ml three neck round bottom flask and the combined continuous-dispersed phases is then first mechanically mixed and then homogenized using a Heat Systems Inc. 20 KHz, 550 watts sonicating probe, model XL2020 (Farmingdale, N.Y.) at 50% power for 1 minute. The round bottom flask is then transferred to a temperature controlled sonicating tank and the homogenized mixture is then simultaneously heated at 60° C., stirred using an overhead stirrer at 350 rpm and sonicated using a 40 KHz, 600 watts, immersible sonicator (CAE Blackstone, Jamestown, N.Y.) at 55% power for 30 minutes under a nitrogen atmosphere. After 30 minutes the sonication was stopped and the reaction mixture was stirred and heated under a closed nitrogen atmosphere for an additional 18 hours at 60° C. The reaction mixture was then filtered through a 0.5 mm metal mesh screen into a 1 liter beaker. To the beaker is added 400 ml of methanol and manually stirred for 2–3 minutes. To the bottom of the beaker is placed a plate incorporating a series of embedded neodymium permanent magnets (Master Magnetics, Castle Rock, Colo.) and the particles allowed to magnetically separate over 12 hours. At the end of 12 hours, the top layer was then aspirated off. The brown bottom layer was then filtered, washed with methanol and dried under reduced pressure to give 2.1 grams of composite, paramagnetic particles. Elemental analysis of the product gave 29.94% iron.

Ultrasonically Generated Composite Paramagnetic Particles Exhibiting Smaller Average Particle Size

EXAMPLE 7

This example is provided to demonstrate that one can reduce the average particle size of the composite, paramagnetic particles by increasing the stirring speed. To a 500 ml three neck flask is added a solution consisting of 0.4 gram of sodium dodecyl sulfate and 0.4 gram of ethoxylated, phosphated, nonylphenol (Servoxyl VPNZ 20/100 obtained from SERVO DELDEN BV, The Netherlands) dissolved in 350 ml of deionized and degassed water to form the continuous phase. To a beaker containing 6 grams of methacryloxypropyltrimethoxysilane coated magnetite crystals is added 20 grams of styrene, 2.5 grams of divinyl benzene and 0.4 grams of lauroyl peroxide to form the dispersed phase. The dispersed phase is then transferred to the 500 ml four neck round bottom flask and the combined continuous-dispersed phases are sonicated using a Heat Systems Inc. 20 KHz, 550 watts sonicating probe, model XL2020 (Farmingdale, N.Y.) at 50% power for 1 minute. The round bottom flask is then transferred to a temperature controlled sonicating tank and the homogenized mixture is then simultaneously heated at 65° C., stirred using an overhead stirrer at 800 rpm and sonicated using a 40 KHz, 600 watts, immersible sonicator (CAE Blackstone, Jamestown, N.Y.) at 80% power for 30 minutes under a nitrogen atmosphere. After 30 minutes the sonication was stopped and the reaction mixture was stirred and heated under a closed nitrogen atmosphere for an additional 24 hours at 65° C. The reaction mixture was then filtered through a 0.5 mm metal mesh screen into a 1 liter beaker. To the beaker is added 400 ml of methanol and manually stirred for 2–3 minutes. To the bottom of the beaker is placed a plate incorporating a series of embedded neodymium permanent magnets (Master Magnetics, Castle Rock, Colo.) and the particles allowed to magnetically separate over 12 hours. At the end of 12 hours, the top layer was then aspirated off. The brown bottom layer was then filtered, washed with methanol and dried under reduced pressure to give 5.2 grams of composite, paramagnetic particles. Elemental analysis of the product gave 5.12% iron. Transmission electron microscopy and scanning electron microscopy of a sampling of the composite paramagnetic particles indicate the majority of the particles to be on average 2–4 microns in diameter.

As will be apparent to one skilled in the art, various modifications can be made within the scope of the aforesaid description. Such modifications being within the ability of one skilled in the art form a part of the present invention and are embraced by the appended claims.

What is claimed is:

1. A paramagnetic particle comprising:
   a plurality of interconnected bead aggregates separated by vacuous cavities, wherein a portion of said bead aggregates are covalently interconnected;
   each said bead aggregate comprises two or more primary beads attached to each other and at least two of said two or more primary beads are covalently attached to each other;
   each said primary bead comprising a polymer of at least one vinyl monomer;
   a plurality of magnetite crystals dispersed within said primary beads, on the surface of said primary beads and between said primary beads.

2. The paramagnetic particle of claim 1 wherein the diameter of said paramagnetic particle is at least 10 times the diameter of each of said primary beads.

3. The paramagnetic particle of claim 2 wherein the size of each said primary bead is less than 1 micron.

4. The paramagnetic particle of claim 1 wherein said polymer has a level of cross-linking of greater than or equal to 1%.

5. The paramagnetic particle of claim 1 wherein the diameter of said magnetite crystals is less than about 0.1 micrometers.

6. The paramagnetic particle of claim 1 wherein the diameter of said paramagnetic particle is between from about 0.5 to about 1000 micrometers.

7. The paramagnetic particle of claim 1 wherein said at least one vinyl monomer is selected from the group consisting of styrene, chloromethyl styrene, divinyl benzene and divinyl benzene derivatives.

8. The paramagnetic particle of claim 1, wherein the paramagnetic particle comprises reactive functional groups.

9. The paramagnetic particle of claim 1, wherein the paramagnetic particle comprises alkyl halide functional groups.

10. The paramagnetic particle of claim 1, wherein the at least one vinyl monomer comprises a divinyl monomer.

11. The paramagnetic particle of claim 1, wherein the diameter of the paramagnetic particle is from about 2 to about 4 micrometers.

12. The paramagnetic particle of claim 1, wherein the amount of the magnetite in the paramagnetic particle is between about 4% to about 25% by weight.

13. The paramagnetic particle of claim 1, wherein the paramagnetic particle is produced using ultrasound.

14. The paramagnetic particle of claim 1, wherein the diameter of the paramagnetic particle is greater than about 2 micrometers.

15. A paramagnetic particle comprising:

a plurality of interconnected submicron primary beads separated by vacuous cavities, wherein a portion of said primary beads are covalently interconnected;

each said primary bead comprising a polymer of at least one vinyl monomer;

a plurality of magnetite crystals dispersed within said primary beads, on the surface of said primary beads and between said primary beads.

16. The paramagnetic particle of claim 15, wherein the paramagnetic particle has a diameter at least 10 times that of each of the primary beads.

17. The paramagnetic particle of claim 15, wherein the paramagnetic particle comprises alkyl halide functional groups.

18. The paramagnetic particle of claim 15, wherein the diameter of the paramagnetic particle is between about 0.5 to about 1000 micrometers.

19. The paramagnetic particle of claim 15, wherein the diameter of the paramagnetic particle is from about 2 to about 4 micrometers.

20. The paramagnetic particle of claim 15, wherein the amount of the magnetite in the paramagnetic particle is between about 4% to about 25% by weight.

21. The paramagnetic particle of claim 15, wherein the paramagnetic particle is produced using ultrasound.

22. The paramagnetic particle of claim 15, wherein the diameter of the paramagnetic particle is greater than about 2 micrometers.

* * * * *